United States Patent [19]

Yamasaki

[11] Patent Number: 4,596,539
[45] Date of Patent: Jun. 24, 1986

[54] BICYCLE DRIVE CHAIN
[75] Inventor: Kazuto Yamasaki, Osaka, Japan
[73] Assignee: Maeda Industries, Ltd., Osaka, Japan
[21] Appl. No.: 731,275
[22] Filed: May 7, 1985
[51] Int. Cl.⁴ .............................................. F16G 13/02
[52] U.S. Cl. ................................... 474/206; 474/226
[58] Field of Search .......................... 474/226–231, 474/206; 59/4, 5, 6, 901, 78

[56] References Cited

U.S. PATENT DOCUMENTS

| | | | |
|---|---|---|---|
| 1,105,288 | 7/1914 | Morse | 474/231 X |
| 2,568,649 | 9/1951 | McIntosh et al. | 474/231 |
| 2,568,650 | 9/1951 | McIntosh et al. | 474/227 X |
| 3,359,815 | 12/1967 | Jeffrey et al. | 474/231 |
| 4,265,134 | 5/1981 | Dupoyet | 474/231 |

FOREIGN PATENT DOCUMENTS 1595091 8/1981 United Kingdom .

Primary Examiner—James A. Leppink
Assistant Examiner—Frank McKenzie
Attorney, Agent, or Firm—Birch, Stewart, Kolasch & Birch

[57] ABSTRACT

A bicycle drive chain comprises a series of inner and outer link pairs connected in longitudinal alternation thereof, in which each of a first some of the outer link pairs includes a first left side and a first right side outer link plates, only the first right side outer link plate having a cutout or hollow formed in its inward-facing marginal edge, and each of a second some of the outer link pairs includes a second left side and a second right side outer link plates, only the second left side outer link plate having a cutout or hollow formed in its inward-facing marginal edge; and/or each of a first some of the inner link pairs includes a first left side and a first right side inner link plates, only the first right side inner link plate having a cutout or hollow formed in its inward-facing marginal edge, and each of a second some of the inner link pairs includes a second left side and a second right side inner link plates, only the second left side inner link plate having a cutout or hollow formed in its inward-facing marginal edge.

3 Claims, 17 Drawing Figures

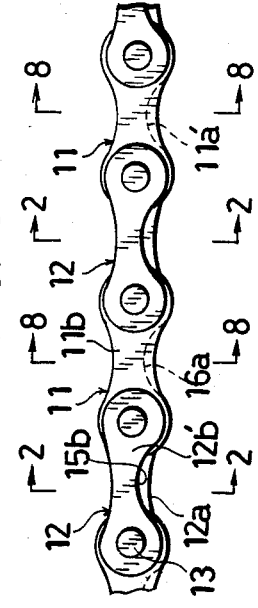
FIG. 9
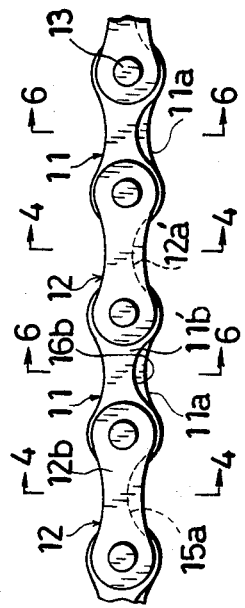
FIG. 10
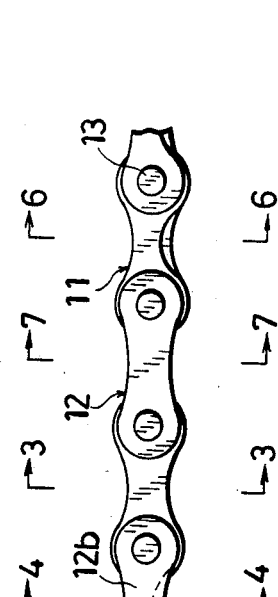
FIG. 11
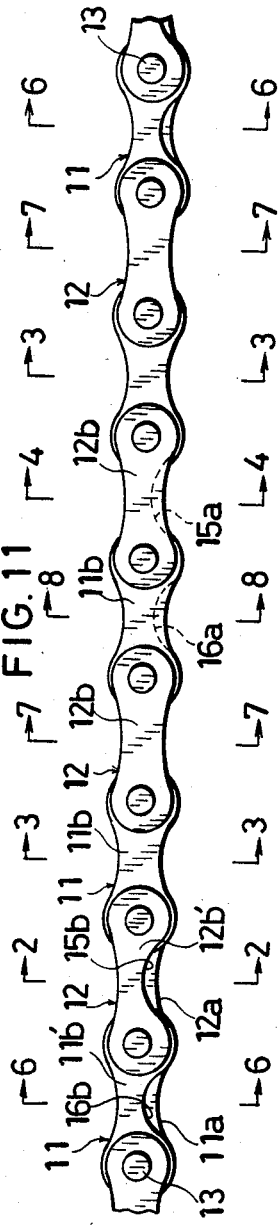
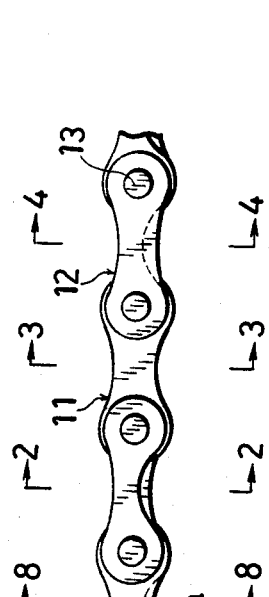
FIG. 12
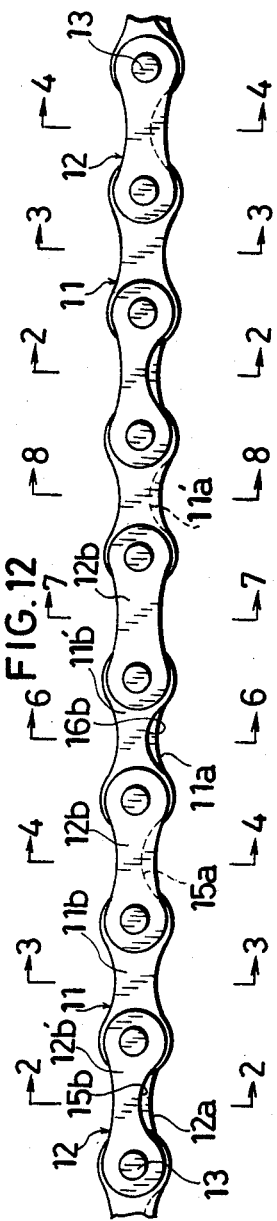

BICYCLE DRIVE CHAIN

BACKGROUND AND SUMMARY OF THE INVENTION

This invention relates to a bicycle drive chain, and more particularly to improvements in the endless roller chain which is particularly advantageous when used with such a particular type of bicycle that is equipped with not only a multiple freewheel (rear speed change gear) cooperating with a rear derailleur, but also a multiple chainwheel (front speed change gear) cooperating with a front derailleur.

As is well known in the field of art, the multiple freewheel has a plurality of (usually three to eight) different sized sprockets arranged in order of diameter in such a manner that any one sprocket disposed on the left of an adjacent sprocket is smaller in diameter than the latter, when viewed from front of the bicycle (See FIG. 15 of the accompanying drawing). On the other hand, the multiple chainwheel has a plurality of (usually two to four) different sized sprockets arranged in order of diameter in such a manner that any one sprocket disposed on the right of an adjacent sprocket is smaller in diameter than the latter, when viewed from front of the bicycle (See FIG. 14 of the accompanying drawings).

As is also well known, the bicycle drive chain generally includes a series of link pairs, more specifically, inner and outer link pairs connected in longitudinal alternation thereof by means of pins, each of the inner link pairs having a left side and right side flat inner link plates extending in parallel with a pair of spaced rollers interposed therebetween, and each of the outer link pairs having a left side and a right side flat outer link plates extending in partially overlying relationship with respect to each of the left side and the right side inner link plates of a neighboring pair of the inner link pairs.

As is also well known, when changing a speed gear position of the bicycle, it is necessary to shift a part of the running endless chain in the direction substantially transverse to its running direction so that the chain can be smoothly disengaged from one sprocket now in operation to come into new engagement with any selected sprocket of a multiple freewheel (or a multiple chainwheel) by means of a rear derailleur (or a front derailleur). This chain shift must be done smoothly and quickly without causing unexpected disengagement of the chain from the sprockets.

In fact, however, when the chain is shifted from a smaller sprocket to a larger sprocket, the chain occasionally fails to mesh with the teeth of the larger sprocket, because a certain leading part of the chain to be shifted must behave so as to climb up one side wall of the larger sprocket. More specifically, the tensioned chain must be partially raised up by a distance defined by a difference between a radius of the larger sprocket and that of the smaller sprocket until one link plate (i.e. one of the left side outer link plate, the right side outer link plate, the left inner link plate, or the right side inner link plate) of a certain leading one of a series of connected link pairs of the chain can catch and ride across a top of an accessible tooth of the sprocket and then the following link pairs are guided into mesh with the corresponding sprocket teeth.

Thus, it is possible to say that the shiftability of the bicycle chain from one sprocket to another sprocket depends on not only performance of the derailleur but also form of the chain itself. Accordingly, it is very important that the chain has at least some of its link plates so formed as to permit easy engagement with the encountered teeth of any selected sprocket.

As described in the foregoing, the arrangement of the different sized sprockets of the multiple freewheel is converse in order of diameter, as compared to that of the different sized sprockets of the multiple chainwheel. Therefore, from the viewpoint of attaining an easy shift of the chain into engagement with any selected sprocket of the multiple chainwheel, it is necessary to form each of all or some of the left side link plates (the left side inner and/or outer link plates) so that it can easily catch and ride over the top of the accessible tooth of the larger sprocket of the multiple chainwheel with the aid of the front derailleur.

In contrast thereto, from the viewpoint of attaining an easy shift of the chain into engagement with any selected sprocket of the multiple freewheel, it is necessary to form each of all or some of the right side link plates (the right side inner and/or outer link plates) so that it can easily catch and ride over the top of the accessible tooth of the larger sprocket of the multiple freewheel with the aid of the rear derailleur.

However, if both of the left and right sides link plates of the chain are all so formed as to be capable of easily riding over the tops of the encountered teeth of any sprocket, there occurs an undesirable skipping-over of the chain, resulting in that the chain is mis-shifted over a selected sprocket onto an undesired sprocket. This phenomenon often occurs when the chain is shifted from a larger sprocket to a desired smaller sprocket. Therefore, this problem should be solved.

In order to achieve the easy shift of the running drive chain into new engagement with any selected sprocket, attempts for improvements in the chain itself have been proposed; and a typical example of such attempts is disclosed in British Pat. No. 1,595,091, wherein both of the outer side plates of each outer link pair have a recess formed in its respective inside wall. According to this relevant art, however, not only the shiftability of the chain from a smaller sprocket to a larger sprocket but also the prevention of the above-discussed undesirable skipping-over of the chain upon shifting from a larger sprocket to a smaller sprocket is not always satisfactory.

It is, therefore, an object of the invention to provide an improved bicycle drive chain which is particularly advantageous when used with such a particular type bicycle as equipped with not only a multiple freewheel cooperating with a rear derailleur, but also a multiple chainwheel cooperating with a front derailleur, and which is capable of good shiftability not only from one to another of the sprockets of the freewheel, but also from one to another of the sprockets of the chainwheel, without skipping over a desired sprocket on which the chain is to be shifted.

Another object of the invention is to provide an improved bicycle drive chain which can be utilized in combination with the conventional sprockets of the multiple freewheel and the multiple chainwheel without any modification to such conventional sprockets.

A further object of the invention is to provide an improved bicycle drive chain which is simple in construction and permits manufacture at a low cost.

The above and other objects, features and advantages of the invention will be become apparent from the following description of preferred embodiments thereof taken in connection with the accompanying drawings.

According to one aspect of the present invention, there is provided a bicycle drive chain which comprises a series of inner and outer link pairs connected in longitudinal alternation thereof by means of pins, each of the inner link pairs having a left side and a right side flat inner link plates which have no cutout or hollow formed therein and extend in parallel with a pair of spaced rollers interposed therebetween, and each of the outer link pairs having a left side and a right side flat outer link plates extending in partially overlying relationship with respect to each of the left side and the right side inner link plates of the neighboring inner link pairs, wherein each of a first some of the outer link pairs includes such a specific right side outer link plate having a cutout or hollow formed in a slightly arcuate, inward-facing marginal edge thereof so that this right side outer link plate can easily ride over a top of an accessible tooth of any selected sprocket of a multiple freewheel onto which the chain is to be shifted, and a left side outer link plate having no cutout or hollow formed therein, so that this left side outer link plate is prevented from riding over the afore-said top of the tooth of the selected sprocket of the multiple freewheel; and each of a second some of the outer link pairs includes such a specific left side outer link plate having a cutout or hollow formed in a slightly arcuate, inward-facing marginal edge thereof so that this left side outer link plate can easily ride over a top of an accessible tooth of a selected sprocket of a multiple chainwheel onto which the chain is to be shifted, and a right side outer link plate having no cutout or hollow formed therein, so that this right side outer link plate is prevented from riding over the afore-said top of the tooth of the selected sprocket of the chainwheel.

According to another aspect of the invention, there is provided a bicycle drive chain which comprises a series of inner and outer link pairs connected in longitudinal alternation thereof by means of pins, each of the inner link pairs having a left side and a right side flat inner link plates extending in parallel with a pair of spaced rollers interposed therebetween, and each of the outer link pairs having a left side and a right side flat outer link plates which have no cutout or hollow formed therein and extend in partially overlying relationship with respect to each of the left side and the right side inner link plates of the neighboring inner link pairs, wherein each of a first some of the inner link pairs includes such a specific right side inner link plate having a cutout or hollow formed in a slightly arcuate, inward facing marginal edge thereof so that this right side inner link plate can easily ride over a top of an accessible tooth of any selected sprocket of a multiple freewheel onto which the chain is to be shifted, and a left side inner link plate having no cutout or hollow formed therein, so that this left side inner link plate is prevented from riding over the afore-said top of the tooth of the selected sprocket of the multiple freewheel; and each of a second some of the inner link pairs includes such a specific left side inner link plate having a cutout or hollow formed in a slightly arcuate, inward-facing marginal edge thereof so that this left side inner link plate can easily ride over a top of an accessible tooth of a multiple chainwheel onto which the chain is to be shifted, and a right side inner link plate having no cutout or hollow formed therein, so that this right side inner link plate is prevented from riding over the afore-said top of the tooth of the selected sprocket of the chainwheel.

According to a further aspect of the invention, there is provided a bicycle drive chain which comprises a series of inner and outer link pairs connected in longitudinal alternation thereof by means of pins, each of the inner link pairs having a left side and a right side flat inner link plates extending in parallel with a pair of spaced rollers interposed therebetween, and each of the outer link pairs having a left side and a right side flat outer link plates extending in partially overlying relationship with respect to each of the left side and the right side inner link plates of the neighboring inner link pairs, wherein each of a first some of the outer link pairs includes such a specific right side outer link plate having a cutout or hollow formed in a slightly arcuate, inward-facing marginal edge thereof so that this right side outer link plate can easily ride over a top of an accessible tooth of any selected sprocket of a multiple freewheel onto which the chain is to be shifted, and a left side outer link plate having no cutout or hollow formed therein, so that this left side outer link plate is prevented from riding over the afore-said top of the tooth of the selected sprocket of the freewheel; each of a second some of the outer link pairs includes such a specific left side outer link plate having a cutout or hollow formed in a slightly arcuate, inward-facing marginal edge thereof so that this left side outer link plate can easily ride over a top of an accessible tooth of any selected sprocket of a multiple chainwheel onto which the chain is to be shifted, and a right side outer link plate having no cutout or hollow formed therein, so that this right side outer link plate is prevented from riding over the afore-said top of the tooth of the selected sprocket of the chainwheel; each of a first some of the inner link pairs includes such a specific right side inner link plate having a cutout or hollow formed in a slightly arcuate, inward-facing marginal edge thereof so that this right side inner link plate can easily ride over a top of an accessible tooth of any selected sprocket of the multiple freewheel onto which the chain is to be shifted, and a left side inner link plate having no cutout or hollow formed therein, so that this left side inner link plate is prevented from riding over the afore-said top of the tooth of the selected sprocket of the freewheel; and each of a second some of the inner link pairs includes such a specific left side inner link plate having a cutout or hollow formed in a slightly arcuate, inward-facing marginal edge thereof so that this left side inner link plate can easily ride over a top of an accessible tooth of any selected sprocket of the multiple chainwheel onto which the chain is to be shifted, and a right side inner link plate having no cutout or hollow formed therein, so that this right side inner link plate is prevented from riding over the afore-said top of the tooth of the selected sprocket of the chainwheel.

BRIEF DESCRIPTION OF THE DRAWINGS

In the accompanying drawings:

FIGS. 9 to 13 are similar views to FIG. 1, but showing further embodiments of the invention.

DESCRIPTION OF THE PREFERRED EMBODIMENTS

Referring now to the accompanying drawings, in particular to FIGS. 1 to 17, a bicycle drive chain according to the invention comprises a series of link pairs, more particularly inner link pairs 11 and outer link pairs 12 connected in longitudinal alternation thereof by means of known pins 13.

Each of the inner link pairs 11 has a left side and a right side flat inner link plates which extend in parallel with known rollers 14 interposed therebetween.

Each of the outer link pairs 12 has a left side and a right side flat outer link plates, which extend in partially overlying relationship with respect to each of the left side and the right side inner link plates of the neighboring inner link pairs 11.

Figure 1:
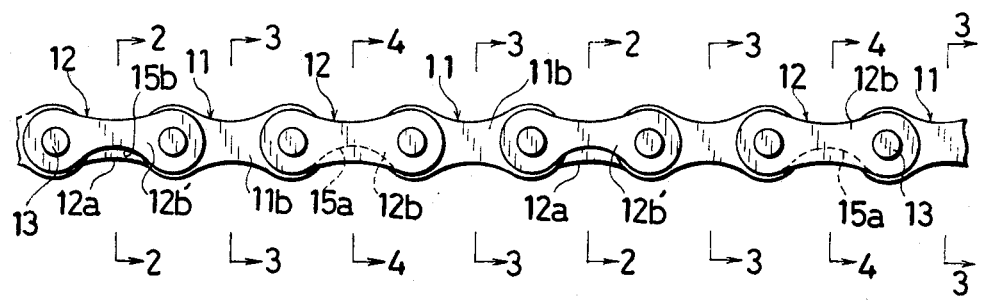
FIG. 1 is a fragmentary side elevation showing a part of a bicycle drive chain according to the invention.
Figure 2:
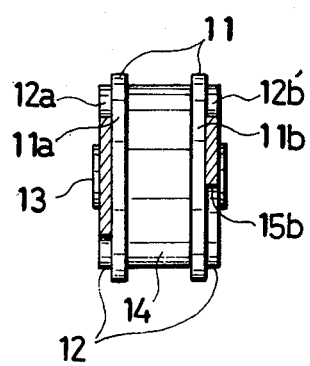
FIG. 2 is an enlarged cross section taken along the lines 2—2 of FIGS. 1 and 10 to 13.
Figure 4:
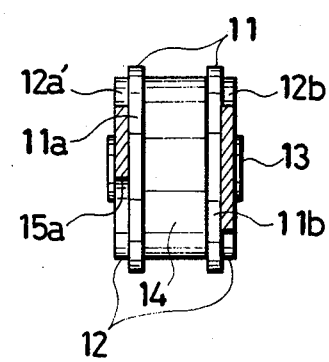
FIG. 4 is an enlarged cross section taken along the lines 4—4 of FIGS. 1, 9, and 11 to 13.
Figure 3:
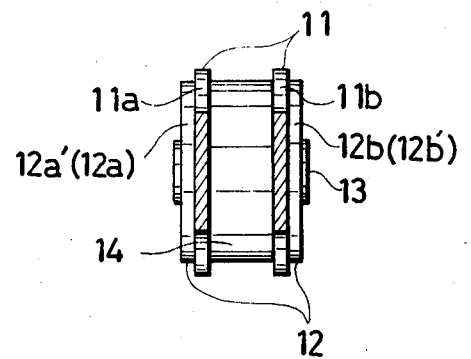
FIG. 3 is an enlarged cross section taken along the lines 3—3 of FIGS. 1, 11 and 13.
Figure 15:
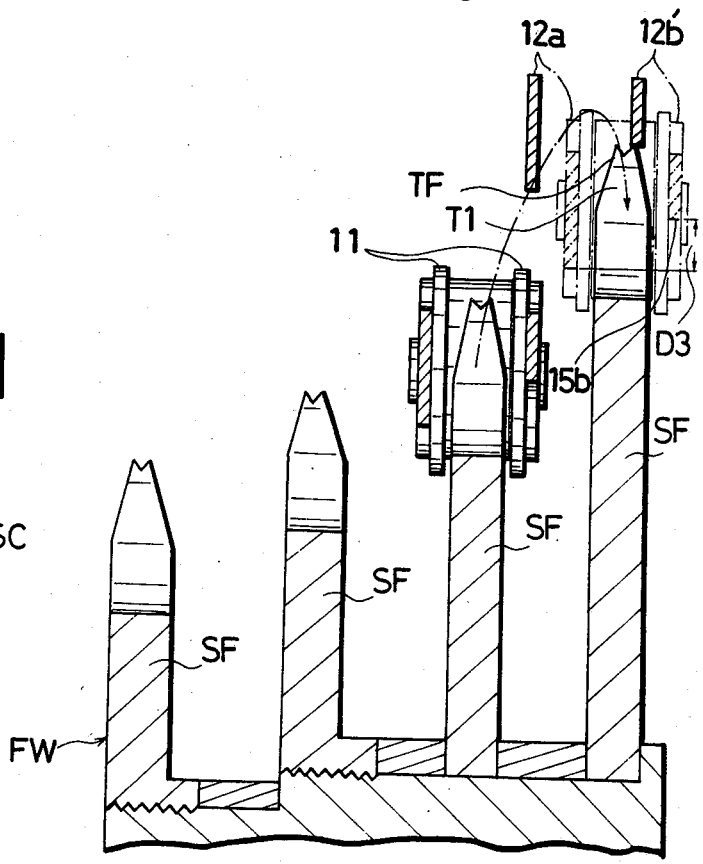
FIGS. 15 and 17 are enlarged cross sections showing shifting manners of the chain from a smaller sprocket to a larger sprocket of a multiple freewheel.

In the embodiment as illustrated in FIG. 1, each of a first some of the outer link pairs 12 includes such a specific right side outer link plate 12b' having a cutout or hollow 15b formed in a slightly arcuate, inward-facing (downward-facing in FIG. 1) marginal edge thereof so that this right side outer link plate 12b' can easily ride over a top TF of an accessible tooth T1 of any selected sprocket SF of a multiple freewheel FW onto which the chain is to be shifted as illustrated in a phantom line in FIG. 15, and a left side outer link plate 12a of conventional form that has no cutout or hollow formed therein. Thus, this left side outer link plate 12a is prevented from riding over the afore-said top TF of the tooth T1, so that chain can be engaged with the selected sprocket SF of the freewheel FW.

Figure 14:
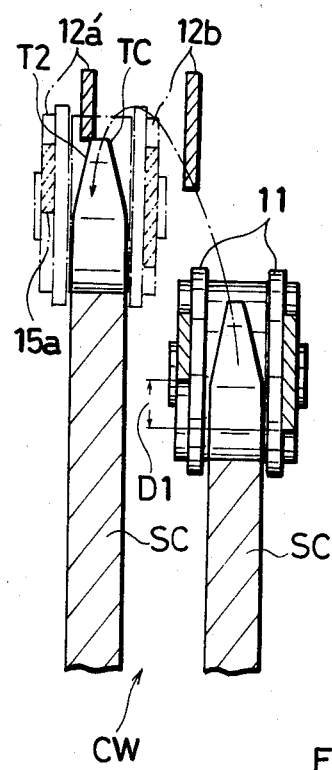
FIGS. 14 and 16 are enlarged cross sections showing shifting manners of the chain from a smaller sprocket to a larger sprocket of a multiple chainwheel.

Each of a second some of the outer link pairs 12 includes such a specific left side outer link plate 12a' having a cutout or hollow 15a formed in a slightly arcuate, inward-facing (downward-facing in FIG. 1) marginal edge thereof so that this left side outer link plate 12a' can easily ride over a top TC of an accessible tooth T2 of a selected sprocket SC of a multiple chainwheel CW onto which the chain is to be shifted as illustrated in a phantom line in FIG. 14, and a right side outer link plate 12b of the conventional form that has no cutout or hollow formed therein. Thus, this right side outer link plate 12b is prevented from riding over the afore-said top TC of the tooth T2 of the sprocket SC of the chainwheel CW, so that the chain can be engaged with the selected sprocket SC of the chainwheel CW.

The embodiment of FIG. 1 further includes the inner link pairs 11 each having conventionally formed left side and right side inner link plates 11a, 11b with no cutout or hollow formed therein.

Figure 5:
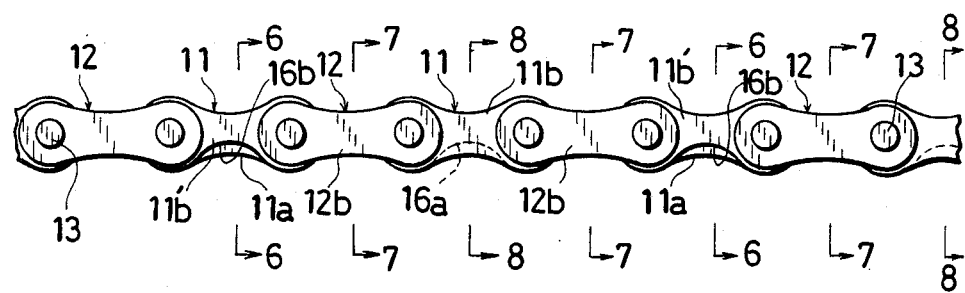
FIG. 5 is a similar view to FIG. 1, but showing another embodiment of the invention.
Figure 6:
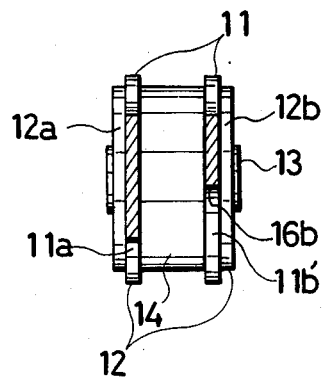
FIG. 6 is an enlarged cross section taken along the lines 6—6 of FIGS. 5, 9, and 11 to 13.
Figure 8:
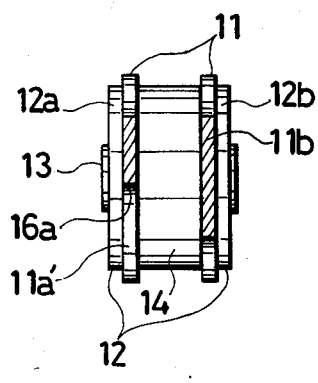
FIG. 8 is an enlarged cross section taken along the lines 8—8 of FIGS. 5 and 10 to 13.
Figure 7:
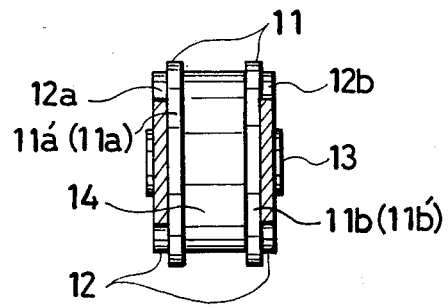
FIG. 7 is an enlarged cross section taken along the lines 7—7 of FIGS. 5, 11 and 12.
Figure 17:
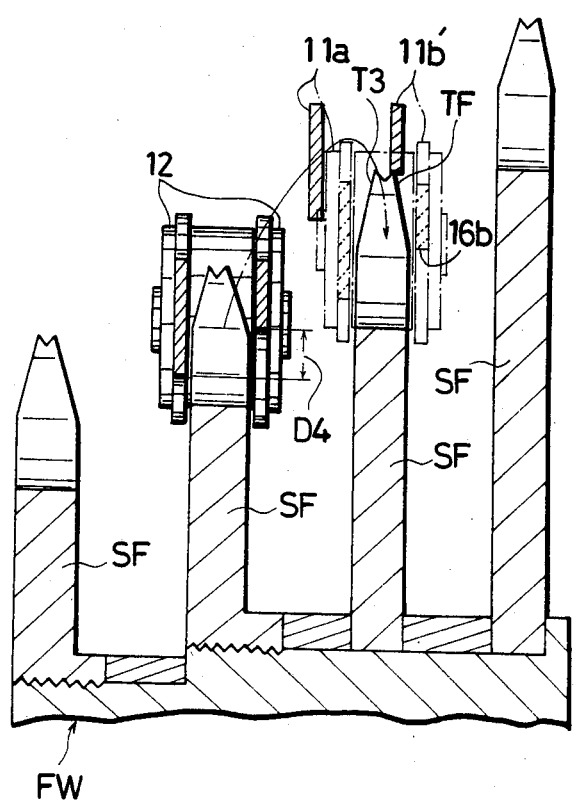

FIG. 5 illustrates another embodiment of the invention, wherein each of a first some of the inner link pairs 11 includes such a specific right side inner link plate 11b' having a cutout or hollow 16b formed in a slightly arcuate, inward-facing (downward-facing in FIG. 5) marginal edge thereof so that this right side inner link plate 11b' can easily ride over the top TF of an accessible tooth T3 of any selected sprocket SF of the multiple freewheel FW onto which the chain is to be shifted as illustrated in a phantom line in FIG. 17, and a conventionally formed left side inner link plate 11a having no cutout or hollow formed therein. Thus, this left side inner link plate 11a is prevented from riding over the afore-said top TF of the tooth T3, so that the chain can be engaged with the selected sprocket SF of the freewheel FW.

Figure 16:
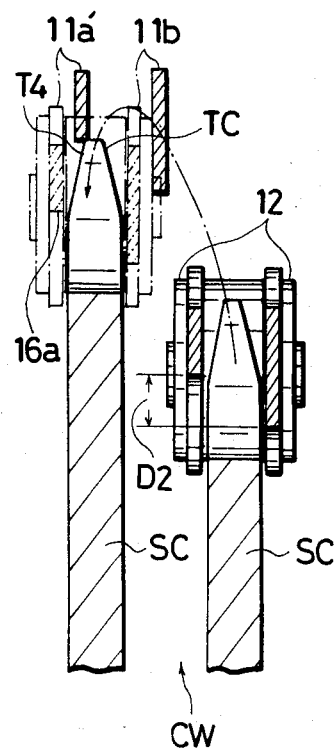

Each of a second some of the inner link pairs 11 includes such a specific left side inner link plate 11a' having a cutout or hollow 16a formed in a slightly arcuate, inward-facing (downward-facing in FIG. 5) marginal edge thereof so that this left side inner link plate 11a' can easily ride over the top TC of an accessible tooth T4 of any selected sprocket SC of the multiple chainwheel CW onto which the chain is to be shifted as illustrated in a phantom line in FIG. 16, and a conventionally formed right side inner link plate 11b having no cutout or hollow formed therein. Thus, this right side inner link plate 11b is prevented from riding over the afore-said top TC of the tooth T4 of the sprocket SC of the chainwheel CW, so that the chain can be engaged with the selected sprocket SC of the chainwheel CW.

The embodiment of FIG. 5 further includes the outer link pairs 12 each having conventionally formed left side and right side outer link plates 12a, 12b with no cutout or hollow formed therein.

In each of the embodiments illustrated in FIGS. 9 to 13, each of a first some of the outer link pairs 12 includes such a specific right side outer link plate 12b' having a cutout or hollow 15b formed in a slightly arcuate, inward-facing marginal edge thereof so that this right side outer link plate 12b' can easily ride over a top TF of an accessible tooth T1 of any selected sprocket SF of a multiple freewheel FW onto which the chain is to be shifted as illustrated in a phantom line in FIG. 15, and a conventionally formed left side outer link plate 12a having no cutout or hollow formed therein. Thus, this left side outer link plate 12a is prevented from riding over the afore-said top TF of the tooth T1, so that chain can be engaged with the selected sprocket SF of the freewheel FW.

Each of a second some of the outer link pairs 12 includes such a specific left side outer link plate 12a' having a cutout or hollow 15a formed in a slightly arcuate, inward-facing marginal edge thereof so that this left side outer link plate 12a' can easily ride over a top TC of an accessible tooth T2 of any selected sprocket SC of a multiple chainwheel CW onto which the chain is to be shifted as illustrated in a phantom line in FIG. 14, and a conventionally formed right side outer link plate 12b having no cutout or hollow formed therein. Thus, this right side outer link plate 12b is prevented from riding over the afore-said top TC of the tooth T2 of the sprocket SC of the chainwheel CW, so that the chain can be engaged with the selected sprocket SC of the chainwheel CW.

Each of a first some of the inner link pairs 11 includes such a specific right side inner link plate 11b' having a cutout or hollow 16b formed in a slightly arcuate, inward-facing marginal edge thereof so that this right side inner link plate 11b' can easily ride over the top TF of an accessible tooth T3 of any selected sprocket SF of the multiple freewheel FW onto which the chain is to be shifted as illustrated in a phantom line in FIG. 17, and a conventionally formed left side inner link plate 11a having no cutout or hollow formed therein. Thus, this left side inner link plate 11a is prevented from riding over the afore-said top TF of the tooth T3, so that chain can be engaged with the selected sprocket SF of the freewheel FW.

Each of a second some of the inner link pairs 11 includes such a specific left side inner link plate 11a' having a cutout or hollow 16a formed in a slightly arcuate, inward-facing marginal edge thereof so that this left side inner link plate 11a' can easily ride over the top TC of an accessible tooth T4 of a selected sprocket SC of the multiple chainwheel CW onto which the chain is to be shifted as illustrated in a phantom line in FIG. 16, and a conventionally formed right side inner link plate 11b having no cutout or hollow formed therein. Thus, this right side inner link plate 11b is prevented from riding over the afore-said top TC of the tooth T4 of the sprocket SC of the chainwheel CW, so that the chain can be engaged with the selected sprocket SC of the chainwheel CW.

Figure 13:
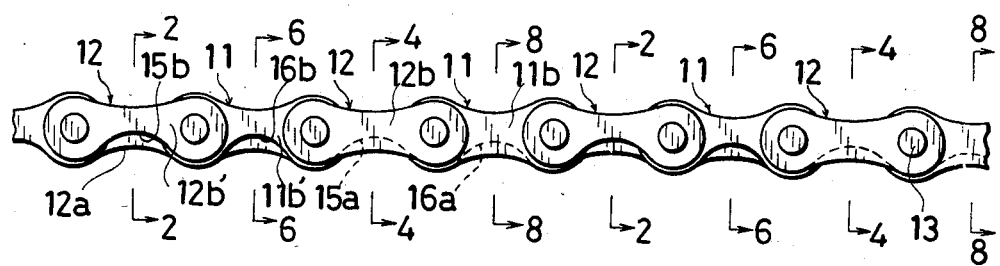

The chain according to the invention may include the conventionally formed outer link pairs each having a right side and a left side outer link plates with no cutout or hollow formed therein and/or the conventionally formed inner link pairs each having a right side and a left side inner link plates 11a, 11b with no cutout or hollow formed therein, as illustrated in FIGS. 1, 5, 11 and 12, or otherwise may not include such conventionally formed outer and inner link pairs, as illustrated in FIGS. 9, 10 and 13.

The size and configuration of the cutouts or hollows 15a, 16a of the left side link plates 12a', 11a' may preferably be predetermined by taking into consideration a maximum difference between a radius of a larger sprocket and that of an adjacent smaller sprocket of the multiple chainwheel CW. It will be easily understood that if a maximum distance D1 (See FIG. 14) between the inward-facing marginal edge of the right side outer link plate 12b and that of the left side outer link plate 12a' and a maximum distance D2 (See FIG. 16) between the inward-facing marginal edge of the right side inner link plate 11b and that of the left side inner link plate 11a' are not large enough, the expected smooth shiftability of the chain from the smaller sprocket to the larger sprocket of the chainwheel CW is difficult to obtain.

Likewise, the size and configuration of the cutouts or hollows 15b, 16b of the right side link plates 12b', 11b' may preferably be predetermined by taking into consideration a maximum difference between a radius of a larger sprocket and that of an adjacent smaller sprocket of the multiple freewheel FW. It will be easily understood that if a maximum distance D3 (See FIG. 15) between the inward-facing marginal edge of the left side outer link plate 12a and that of the right side outer link plate 12b' and a maximum distance D4 (See FIG. 17) between the inward-facing marginal edge of the left side inner link plate 11a and that of the left side inner link plate 11b' are not large enough, the expected smooth shiftability of the chain from the smaller sprocket to the larger sprocket of the freewheel FW is difficult to obtain.

The present invention being thus described, it will be easily understood that same may be varied in many ways by various combinations of two or more different forms of inner and outer link pairs 11, 12, namely, the first form of link pairs each having the link plates 12a, 12b', the second form of link pairs each having the link plates 12a', 12b, the third form of link pairs each having the link plates 12a, 12b, the fourth form of link pairs each having the link plates 11a, 11b', the fifth form of link pairs each having the link plates 11a', 11b, and the sixth form of link pairs each having the link plates 11a, 11b. All such variations are intended to be included within the scope of the invention.

I claim:

1. A bicycle drive chain comprising
a series of inner and outer link pairs connected in longitudinal alternation thereof,
each of a first some of said outer link pairs including a first left side outer link plate and a first right side outer link plate,
only said first right side outer link plate having a cutout or hollow formed in its inward-facing marginal edge,
each of a second some of said outer link pairs including a second left side outer link plate and a second right side outer link plate, and
only said second left side outer link plate having a cutout or hollow formed in its inward-facing marginal edge.

2. A bicycle drive chain comprising
a series of inner and outer link pairs connected in longitudinal alternation thereof,
each of a first some of said inner link pairs including a first left side inner link plate and a first right side inner link plate,
only said first right side inner link plate having a cutout or hollow formed in its inward-facing marginal edge,
each of a second some of said inner link pairs including a second left side inner link plate and a second right side inner link plate, and
only said second left side inner link plate having a cutout or hollow formed in its inward-facing marginal edge.

3. A bicycle drive chain comprising
a series of inner and outer link pairs connected in longitudinal alternation thereof,
each of a first some of said outer link pairs including a first left side outer link plate and a first right side outer link plate,
only said first right side outer link plate having a cutout or hollow formed in its inward-facing marginal edge,
each of a second some of said outer link pairs including a second left side outer link plate and a second right side outer link plate,
only said second left side outer link plate having a cutout or hollow formed in its inward-facing marginal edge,
each of a first some of said inner link pairs including a first left side inner link plate and a first right side inner link plate,
only said first right side inner link plate having a cutout or hollow formed in its inward-facing marginal edge,
each of a second some of said inner link pairs including a second left side inner link plate and a second right side inner link plate, and
only said second left side inner link plate having a cutout or hollow formed in its inward-facing marginal edge.

* * * * *